United States Patent

Goldman

[11] 4,038,734
[45] Aug. 2, 1977

[54] METHOD OF MANUFACTURING A BUTTERFLY VALVE

[75] Inventor: Holliday L. Goldman, Red Lion, Pa.

[73] Assignee: Allis-Chalmers Corporation, Milwaukee, Wis.

[21] Appl. No.: 704,641

[22] Filed: July 12, 1976

[51] Int. Cl.² .................. B23P 15/00; B21D 53/00; F16K 1/22

[52] U.S. Cl. .................. 29/157.1 R; 29/416; 251/305

[58] Field of Search .................. 29/157.1 R, 416, 412, 29/DIG. 26; 251/308, 305, 306, 307

[56] References Cited

U.S. PATENT DOCUMENTS

| 1,039,722 | 10/1912 | Fullman | 29/416 |
|---|---|---|---|
| 2,983,030 | 5/1961 | Spicacci | 29/416 |
| 3,025,035 | 3/1962 | Swain | 251/306 |
| 3,081,791 | 3/1963 | Wheatley | 251/308 |
| 3,172,192 | 3/1965 | Dresden | 29/416 |
| 3,318,567 | 5/1967 | Gifford | 29/157.1 R |
| 3,552,341 | 1/1971 | Lannin | 29/416 |
| 3,591,133 | 7/1971 | Miles et al. | 251/173 |
| 3,658,292 | 4/1972 | Takigawa | 251/306 |
| 3,698,686 | 10/1972 | Williams | 251/306 |
| 3,803,690 | 4/1974 | Cann et al. | 29/416 |

Primary Examiner—C.W. Lanham
Assistant Examiner—Daniel C. Crane
Attorney, Agent, or Firm—John P. Hines

[57] ABSTRACT

The method of manufacturing a butterfly valve from plate steel which comprises flame cutting the outer configuration of the valve body and flame cutting a circular disc from the center of the body resulting in a water opening through the body and utilizing the disc as the closure member. The valve is constructed in such a manner that no castings or welding is required.

2 Claims, 2 Drawing Figures

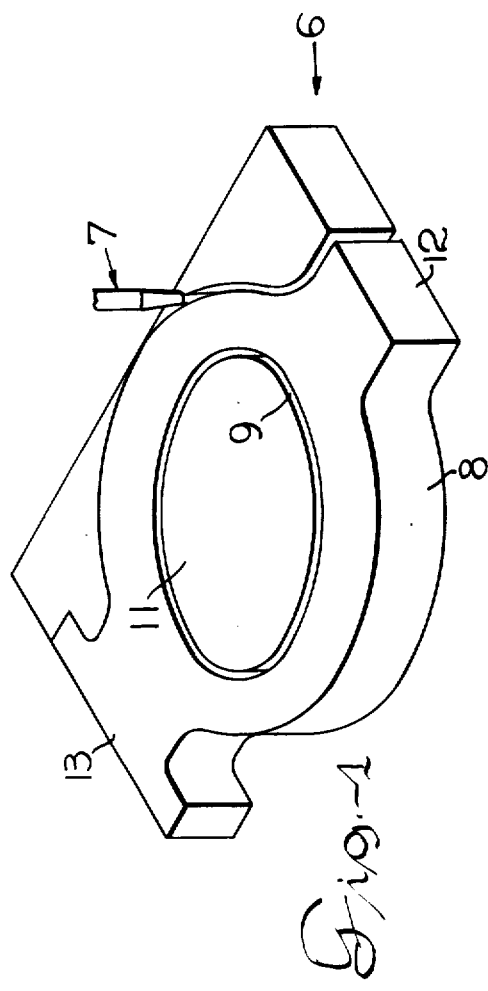
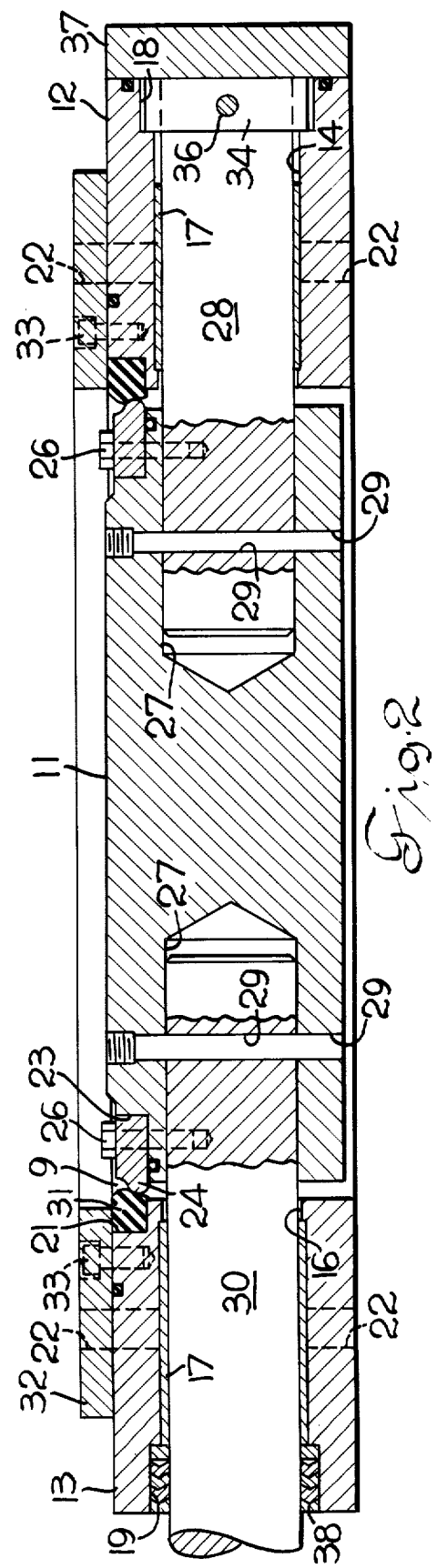

METHOD OF MANUFACTURING A BUTTERFLY VALVE

This invention pertains in general to butterfly valves and more particularly to a butterfly valve wherein no casting or weldments are utilized in construction of the valve.

Conventional valves of the butterfly type employ a disc like closure member carried by shaft means such as a through shaft or shaft trunnions journalled in the valve body. The disc is movable through 90 degrees between a closed position in which the disc extends substantially at right angles to the axis of the flow passage and an open position in which the disc extends substantially coincident with such axis.

In the past, it has been the practice to construct butterfly valves of castings having axially spaced twin mounting flanges which were bolted to the water pipe. An example of such a prior art butterfly valve is shown in U.S. Pat. No. 3,532,321 issued to G. K. Bowman et al, Oct. 6, 1970.

Examples of other prior art butterfly valves are shown in the following U.S. patent No: 2,853,267; 2,946,553 and 3,591,133. Although these patents do not specifically state how the butterfly valve is constructed, it has been the usual practice in the past to form the valve housing and disc by casting or by utilizing welding procedures.

It is the intention and general object of this invention to construct a butterfly valve without utilizing any casting or welding procedure. This is accomplished by flame cutting a piece of plate steel into the outside configuration of the valve body. The desired water passage opening through the valve body is then provided by cutting a circular disc from the center of the valve body. This disc is utilized as the closure disc. Both the closure disc and valve body are machined and the necessary sealing elements are bolted thereto. In this manner, no casting or welding is necessary.

A more specific object of the subject invention is to provide a method for manufacturing a butterfly valve from plate steel by flame cutting the outside configuration of the valve body and flame cutting a closure disc from the center of the valve body to provide the water passageway therethrough.

A more specific object is to provide a method of manufacturing a butterfly valve of the hereinbefore described type wherein machining operations are provided on the valve body and closure disc to provide mounting space for sealing elements attached to each member.

These and other objects of the subject invention will become more fully apparent as the following description is read in light of the attached drawing wherein:

FIG. 1 is an isometric view of a torch in the process of cutting the outside valve body configuration and a disc from the central portion of the valve body; and FIG. 2 is a cross section of a butterfly valve constructed in accordance with this invention.

Referring to the drawing, and particularly FIG. 1, a piece of plate steel generally designated 6 is shown having the desired composition and thickness necessary to withstand the forces which will be imposed upon the valve when in operation. A torch generally designated 7 is utilized to cut the valve body 8 into the desired outside configuration from the steel plate. The torch is also utilized to cut an opening 9 through the central portion of the valve body to provide the desired water passageway therethrough. The disc 11 which remains after the torch 7 has cut the opening 9 is utilized as the closure disc for the valve. As shown herein for purposes of illustration, the valve body 8 is provided with a pair of oppositely disposed bearing bosses 12 and 13. After the valve body has been cut to the desired configuration by the torch 7, the outside surface of the body 8 and the inner surface of the opening 9 are ground to the desired smoothness. A pair of aligned openings 14 and 16 (FIG. 2) are bored through the oppositely disposed bosses 12 and 13. Shaft sleeves bearings 17 may be provided in these openings. Each of the openings 14 and 16 is provided with enlarged bores 18 and 19, respectively, at the outer ends thereof.

An annular counterbore 21 is machined on one side of the body 8 about the water opening 9. A plurality of circumferentially spaced water pipe mounting holes 22 are drilled and depending on the application may be tapped about the outer surface on each side of the valve body 8. In certain instances, it may be desirable to stagger the mounting holes 22 on opposite sides of the valve body for strength purposes.

An annular recess 23 is machined on one side of the disc 11 about the periphery thereof. A seal ring 24 which may be of stainless steel, depending on the application of the butterfly valve is bolted to the disc 11 by means of a plurality of circumferentially spaced cap screws 26. The disc 11 also has a pair of oppositely disposed bores 27 therein which are alignable with the shaft openings 14 and 16 in the valve body when the disc is located in the operating position within the valve body as shown in FIG. 2.

The valve is assembled by inserting the valve disc 11 with the seal ring 24 attached within the opening 9 in the valve body. Stubshafts 28 and 30 extend through the openings 14 and 16 in the valve body into the bores 27 provided in the valve disc. Pin holes 29 are then bored through the valve disc and the associated stubshaft as shown in FIG. 2. One end of these holes 29 may be threaded as shown for sealing purposes and pins are then passed through these openings to securely attach the disc 11 to the shafts 28 and 30. A composition seal ring 31 is positioned in the annular counterbore 21 to mate with the seal ring 24. The composition seal ring 31 is held in place by a annular plate 32 which overlies the seal ring 31 and is bolted to the valve body by a series of circumferentially spaced cap screws 33.

The stubshaft 28 may be formed with a shoulder thereon or as herein shown for purposes of illustration, a collar 34 is connected to one end of the shaft 28 by means of a pin 36. This collar is located in the annular enlarged opening 18 and a cover plate 37 is bolted to the outer surface of the boss 12 to hold the stubshaft in place. This plate, the collar and the shoulder formed between the enlarged bore 18 and opening 14 provide axial thrust bearing surfaces for the disc 11.

Conventional shaft packing indicated at 38 is provided about the stubshaft 30 in the enlarged opening 16 provided in the outer surface of the boss 13. A valve operator (not shown) is in the conventional manner, connected to an extension of the stubshaft 30 to provide the necessary force to operate the valve disc 11.

From the above description, it can be seen that an inexpensive and yet highly reliable butterfly valve can be constructed in accordance with this invention. In many instances, such as atomic energy applications, it is absolutely necessary to insure the mechanical integrity of the valve. When castings are utilized, expensive inspection procedures and test methods are necessary to insure that the casting does not have dangerous voids therein. Furthermore, whenever weldments are used to assemble a valve utilized in atomic aplications, the welds have to be carefully examined to insure their mechanical integrity. From the above description, it can be seen that the butterfly valve of this application does not utilize any casting or any weldments and therefore the mechanical integrity can be easily verified.

The embodiment of the invention in which an exclusive property or privilege is claimed are defined as follows:

1. The method of manufacturing a butterfly valve from solid plate steel comprising the steps of:
   a. flame cutting a valve body of the desired outside configuration from the steel plate;
   b. flame cutting a closure disc member from the center portion of the valve body thereby providing an opening through the valve body of the desired size to permit fluid flow therethrough;
   c. providing a pair of aligned shaft openings in said valve body member transverse to said fluid opening;
   d. locating said valve disc within said fluid opening through said valve body member;
   e. pivotally mounting a shaft means in said shaft opening:
   f. rigidly attaching said shaft means to said valve disc member;
   g. attaching an annular seal to one of said members whereby said seal closes the annular space between said members when the disc member is in a closed position; and
   h. providing a plurality of circumferentially spaced mounting holes in said body member about said fluid opening.

2. The method of manufacturing a butterfly valve set forth in claim 1 above and further comprising the steps of:
   a. machining an annular recess on one side of said closure disc about the periphery thereof;
   b. rigidly bolting a seal ring to said closure disc within said recess;
   c. machining an annular counterbore in one side of said valve body about said fluid opening;
   d. locating an annular seal ring in said counterbore for selective engagement by said disc seal ring when the valve is in a closed position;
   e. bolting a plate to the surface of said valve body member with a portion thereof extending over said seal ring to clamp same in said counterbore
   f. enlarging the diameter of one of said shaft openings at the outer periphery of said valve body;
   g. attaching a circular collar to the end of said shaft means in said enlarged opening, said collar being equal to said enlarged opening in both depth and diameter; and
   h. attaching a plate to said valve body over said collar.

* * * * *